(12) United States Patent
Randall (10) Patent No.: US 7,986,059 B2
(45) Date of Patent: Jul. 26, 2011

(54) DEVICE COVER WITH EMBEDDED POWER RECEIVER

(75) Inventor: Mitch Randall, Longmont, CO (US)

(73) Assignee: Pure Energy Solutions, Inc., Boulder, CO (US)

( * ) Notice: Subject to any disclaimer, the term of this patent is extended or adjusted under 35 U.S.C. 154(b) by 0 days.

(21) Appl. No.: 12/348,881

(22) Filed: Jan. 5, 2009

(65) Prior Publication Data

US 2009/0179501 A1 Jul. 16, 2009

Related U.S. Application Data

(60) Provisional application No. 61/018,922, filed on Jan. 4, 2008.

(51) Int. Cl.
*H02J 7/00* (2006.01)

(52) U.S. Cl. ......... 307/104; 307/147; 307/150; 320/108

(58) Field of Classification Search .................. 307/104, 307/147, 150; 320/108
See application file for complete search history.

(56) References Cited

U.S. PATENT DOCUMENTS

| | | | |
|---|---|---|---|
| 5,175,409 A | 12/1992 | Kent | |
| 5,793,123 A | 8/1998 | Ho et al. | |
| 5,868,076 A | 2/1999 | Myus et al. | |
| 6,913,477 B2 | 7/2005 | Dayan et al. | |
| 7,495,414 B2 * | 2/2009 | Hui | 320/108 |
| 2003/0210106 A1 | 11/2003 | Cheng et al. | |
| 2004/0048511 A1 | 3/2004 | Dayan et al. | |
| 2004/0082369 A1 | 4/2004 | Dayan et al. | |
| 2004/0131928 A1 * | 7/2004 | Dayan et al. | 429/123 |
| 2004/0195767 A1 | 10/2004 | Randall | |
| 2005/0189910 A1 | 9/2005 | Hui | |
| 2005/0208817 A1 | 9/2005 | Dayan et al. | |
| 2006/0076922 A1 | 4/2006 | CHeng et al. | |
| 2006/0205381 A1 * | 9/2006 | Beart et al. | 455/343.1 |
| 2007/0182367 A1 * | 8/2007 | Partovi | 320/108 |
| 2007/0247883 A1 * | 10/2007 | Belyanin | 363/108 |
| 2007/0279002 A1 * | 12/2007 | Partovi | 320/115 |
| 2009/0015075 A1 * | 1/2009 | Cook et al. | 307/149 |
| 2009/0033280 A1 * | 2/2009 | Choi et al. | 320/108 |
| 2009/0072628 A1 * | 3/2009 | Cook et al. | 307/104 |
| 2009/0096413 A1 * | 4/2009 | Partovi et al. | 320/108 |
| 2009/0102416 A1 * | 4/2009 | Burley | 320/103 |

OTHER PUBLICATIONS

International Search Report for PCT/US09/30161, ISA/US, May 12, 2009.

* cited by examiner

*Primary Examiner* — Jared J Fureman
*Assistant Examiner* — Adi Amrany
(74) *Attorney, Agent, or Firm* — James R. Young; Cochran Freund & Young LLC (57) ABSTRACT

A charging system comprises circuitry adapted to devices to be charged, including a power receiver module embedded or molded into form-fit case, e.g., gel-skin, that attaches physically and electrically to the device to be charged and that effectively receives power either conductively or inductively from a power delivery surface of a recharging pad on which the devices are placed.

8 Claims, 10 Drawing Sheets

DEVICE COVER WITH EMBEDDED POWER RECEIVER

CROSS-REFERENCES TO RELATED APPLICATIONS

This application is a nonprovisional application of provisional application No. 61/018,922 filed Jan. 4, 2008, which is incorporated herein by reference.

BACKGROUND OF THE INVENTION

1. Field of the Invention

The present invention relates to electronic systems and methods for providing electrical power and/or data to one or more electronic or electrically powered devices with a power delivery surface.

2. State of the Prior Art

A variety of electronic or electrically powered devices, such as toys, game devices, cell phones, laptop computers, cameras, and personal digital assistants, have been developed along with ways for powering them. Mobile electronic devices typically include and are powered by batteries which are rechargeable by connecting them through power cord units, which include transformers and/or power converters, to a power source, such as an electric wall outlet or power grid, an automobile or other vehicle accessory electric outlet plug receptacle or the like, either during use of the electronic device or between uses. A non-mobile electronic device is generally one that is powered through a power cord unit and is not intended to be moved during use any farther than the reach of the power cord, so it generally does not have or need batteries for powering the device between plug-ins.

In a typical set-up for a mobile device, the power cord unit includes an outlet connector or plug for connecting it to the power source and a battery connector for connecting it to a corresponding battery power receptacle of the battery. The outlet connector or plug and battery connectors are in communication with each other so electrical signals flow between them. In this way, the power source charges the battery through the power cord unit.

In some setups, the power cord unit may include a power adapter, transformer, or converter connected to the outlet and battery connectors through AC input and DC output cords, respectively. The power adapter adapts an AC input voltage received from the power source through the outlet connector and AC input cord to output a DC voltage through the DC output cord. Others include adapters, transformers, or converters connected to the outlet and battery connectors through DC input and DC output cords. The DC output current flows through the receptacle and is used to charge the battery.

Manufacturers, however, generally make their own models of electronic devices and do not make their power cord unit compatible with the electronic devices of other manufacturers, or with other types of electronic devices. As a result, a battery connector made by one manufacturer will typically not fit into the battery power receptacle made by another manufacturer. Further, a battery connector made for one type of device typically will not fit into the battery power receptacle made for another type of device. Manufacturers make these connectors unique to their own devices for several reasons, such as cost, liability concerns, different power requirements, and to acquire or hold a market share.

However, the proliferation of unique power cords that are not compatible with other devices can be troublesome for consumers because they have to buy unique power cord units for their particular electronic devices and deal with the plethora of different power cords required for their devices. Since people tend to switch devices often, it is inconvenient, expensive, and wasteful for them to also have to switch power cord units, too. Unfortunately, power cord units that are no longer useful are often discarded, which is also wasteful and harmful to the environment. Also, people generally own a number of different types of electronic devices and owning a power cord unit for each one is inconvenient because the consumer must deal with a large quantity of power cord units and the confusion and tangle of power cords the situation creates.

BRIEF DESCRIPTION OF THE DRAWINGS

The accompanying drawings, which are incorporated in and form a part of the specification, illustrate example implementations of the present invention, but not the only ways the invention can be implemented, and together with the written description and claims, serve to explain the principles of the invention.

In the drawings.

DETAILED DESCRIPTION OF THE PREFERRED EMBODIMENTS

Figure 1:
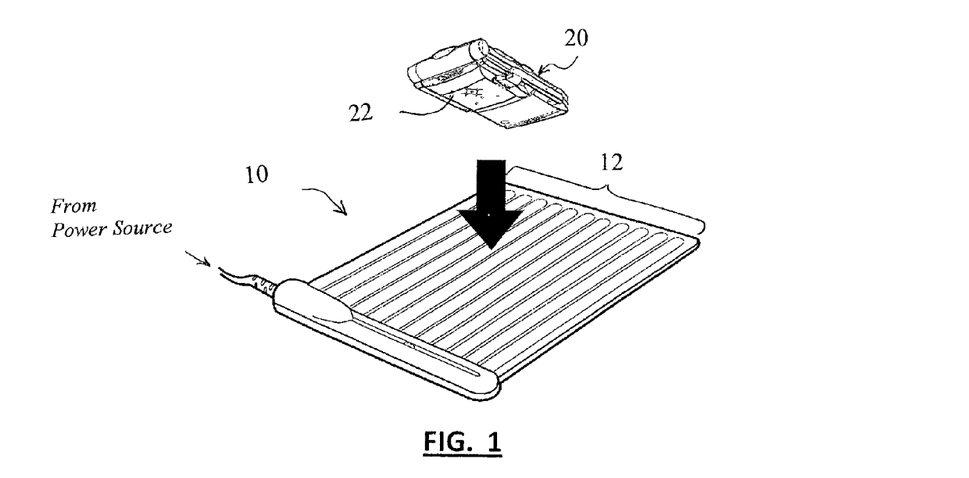
FIG. 1 is a perspective view of a charging pad, which includes a power delivery support surface, and an enabled device to be charged, shown above the power delivery support surface in a position to be lowered onto the power delivery support surface.

An example charging pad 10 and enabled power receiving device 20 are shown in FIG. 1. The charging pad 10 transfers power wirelessly or wire-free, i.e., without a charging adapter cord, to one or more devices 20 resting on it. In this context, the terms "wireless", "wirelessly", and "wire-free" are used to indicate that charging of the device is achieved without a cord-type electric charging unit or adapter, and in the example of FIG. 1, is achieved with through electrical conduction through contacts with selective geometry, as described below. Wireless in this context can be interfacing contacts or magnetic induction, as will be explained below. Also, the term "enabled" device is used for convenience to mean an electronic or electrically powered device, for example, cell phone, computer, radio, camera, personal digital assistant, digital recorder and playback device, hearing aid, GPS receiver or transmitter, medical instrument, or just about any other portable device, that is equipped with charging contacts and associated electronic circuitry to enable the device to be electrically charged by the power pad 10 component.

Figure 2:
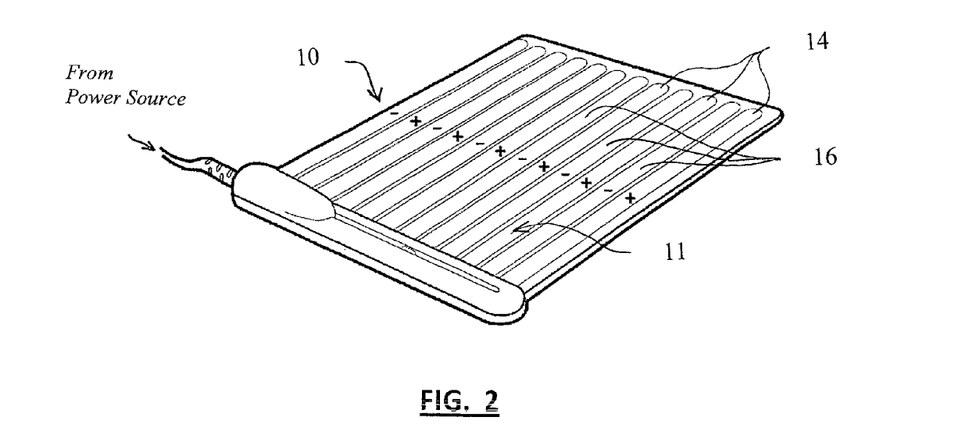
FIG. 2 is an enlarged perspective view of the charging pad of FIG. 1, showing an array of alternately positively and negatively charged contact strips.

The top surface 11 of charging pad 10 comprises an array 12 of contact strips 14, 16, which are energized with low voltage DC or AC so that every other strip, e.g., the strips 14, are positive and the strips 16 in-between the positive strips 14 are negative, or vice versa, as illustrated in FIG. 2.

Figure 3:
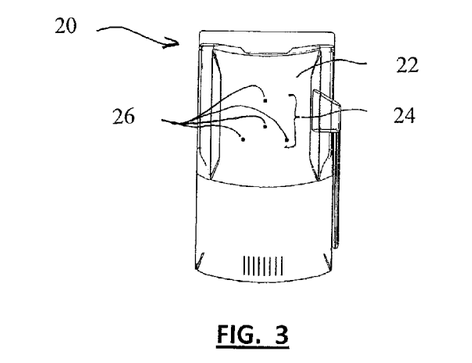
FIG. 3 is a bottom plan view of an enabled device.

On the underside 22 of one example enabled device 20, there are a plurality of conduction contact points 26 arranged in a "constellation" configuration or pattern 24 as shown in FIG. 3. One example constellation pattern 24 comprises four contacts 26 arranged with three of the contacts 26 defining the vertices of an equilateral triangle and the fourth contact 26 in the middle of the equilateral triangle. This pattern is sometimes referred to as a tetrahedron pattern because the four contacts 26 are positioned as the vertices of a tetrahedron would appear in a top plan view of a tetrahedron.

The contact constellation 24 on the enabled device 20 and the contact strip array 12 on the charging pad 10 form a geometrically complementary pair with the property that electrical power can be transferred from the pad 10 into the device 20 regardless of the position and orientation of each particular device 20 on the pad. Several orientations are shown for example in FIG. 4 to illustrate this principle, but they are not the only orientations that work. The particular number, geometric size, and arrangement of the contacts is not the subject of this invention. Suffice it to say that they can be sized, arranged, and shaped to transfer power from the power delivery surface 11 of the charging pad 10 to an enabled charge receiving device 20.

Figure 4:
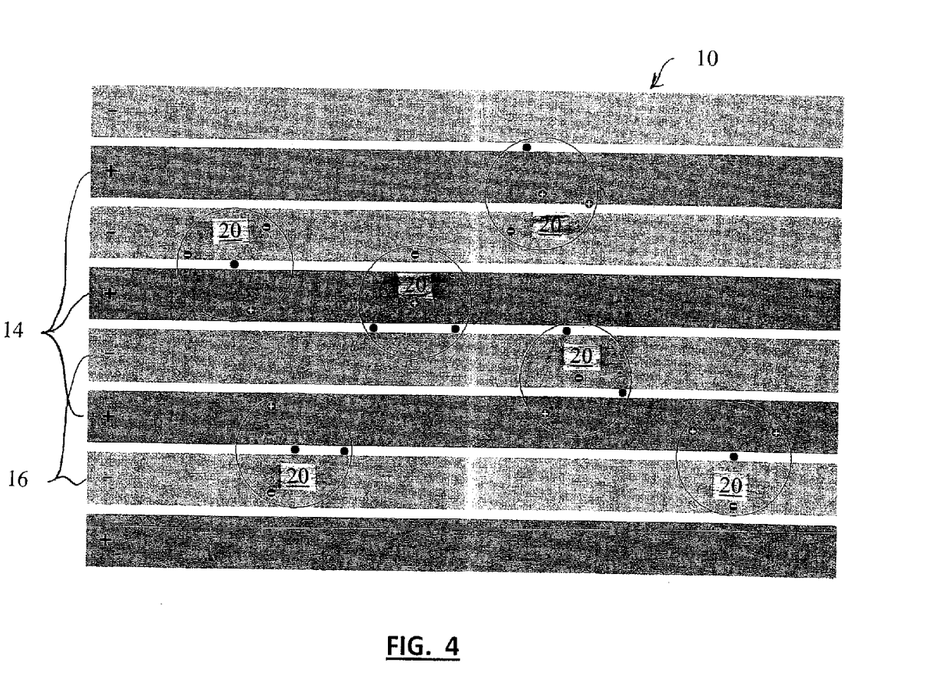
FIG. 4 is a top plan view of a portion of the charging pad of FIG. 1 showing the alternative positive and negative strips and depicting how several enabled devices might be arranged in various orientations for charging on the pad.

As illustrated in FIG. 4, with appropriate sizing, no matter where or at which orientation the constellation 26 is set on the pad 10, at least one positive and one negative contact will be made, thus electrical power can be transferred from the pad 10 to the enabled device 20. Power can be extracted from the contacts 26 using a rectifier 28, see FIG. 5, the output of which is approximately equal to the electrical potential between contact strips or pads 14, 16 of the power delivery surface 11 after allowing for some losses in the rectifier circuit. Note that the rectifier 28 can be a bridge rectifier enabled with diodes (not shown) that also inherently prevents the exposed contacts on the mobile or enabled device from being "live" when they are separated or removed from the charging pad 10. In other words, the diodes in the rectifier 28 between the contacts 26 on the enabled device 20 and the rechargeable battery or capacitor in the enabled device prevents electric current from flowing from the rechargeable battery or capacitor of the device 20 to the contacts 26.

In this architecture, the voltage on the power delivery surface 11 of the charging pad 10 is fixed and independent of the devices 20 resting on the pad surface 11. Each individual device 20 that gets positioned on the charging pad 10 is responsible for conditioning the electric power obtained from the charging pad 10 to power that is appropriate for its own use. This scheme inherently allows for multiple devices 20 of various manufacturers with various power requirements to be charged from the same charging pad 10.

Figure 5:
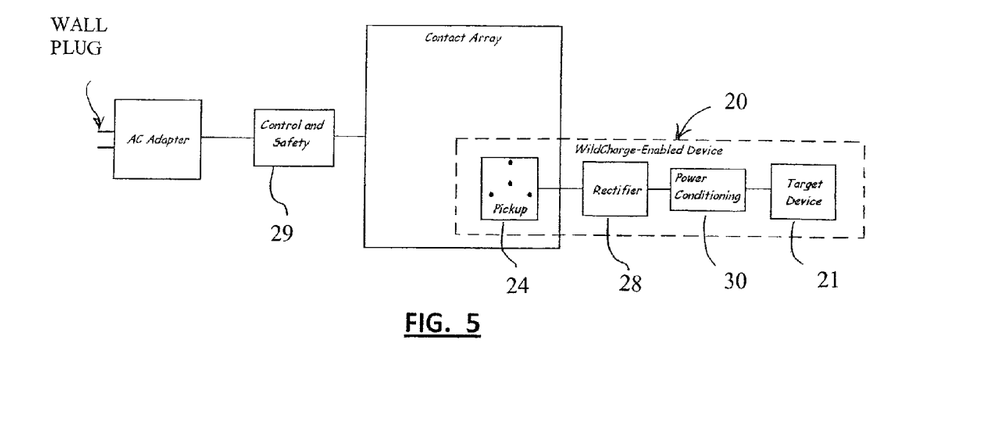
FIG. 5 is a function block diagram of the charging system of FIG. 1.

A function block diagram of the overall system is shown in FIG. 5. In general, each enabled device 20 contains a pickup constellation 24, a rectifier 28, and a power conditioning circuit 30 to bring power to the target device 21.

A control and safety system 29 associated with, and preferably a part of, the charging pad 10 renders the contact array 12 of the power delivery surface 11 benign and safe to the user. The control and safety system 29 is not part of this invention, thus is not described in detail. Suffice it to say that the control and safety system 29 energizes the array 12 only when a compliant load is detected. The system 29 senses the presence of non-enabled devices such as keys or hands and instantly safely shuts down.

Figure 6:
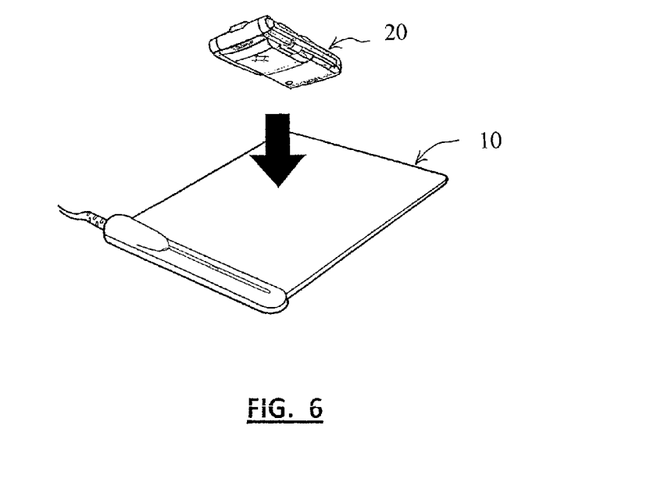
FIG. 6 is a perspective view of an inductive power pad and inductive receiver device.
Figure 7:
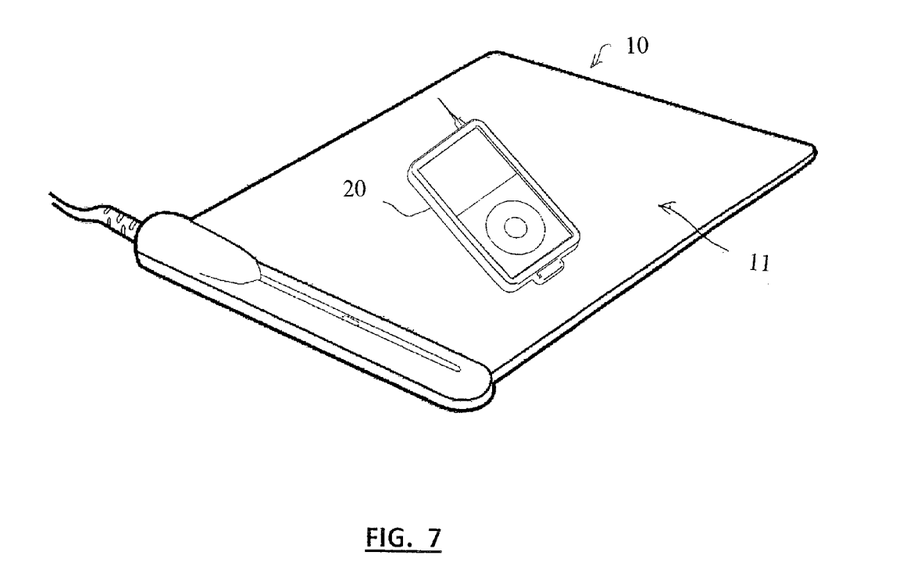
FIG. 7 is a perspective view of the power delivery pad of FIG. 6 with the device receiving power resting on the surface of the power delivery pad.

Inductive power transfer uses a pad 10' that transfers power wirelessly to one or more devices 20' resting on it. This is achieved through electromagnetic induction. An example inductive power pad 10' and complementary inductive receiver device 20' are shown in FIG. 6. FIG. 7 shows the power pad 10' with the receiver device 20' resting on the surface 11' of the pad, in order to charge the device 20'. An alternating magnetic field is generated by one or more of the coils 18 in the pad surface 11' on which a device 20' would rest, and a pick-up coil 40 in the device 20' receives power via the alternating magnetic field.

Figure 8:
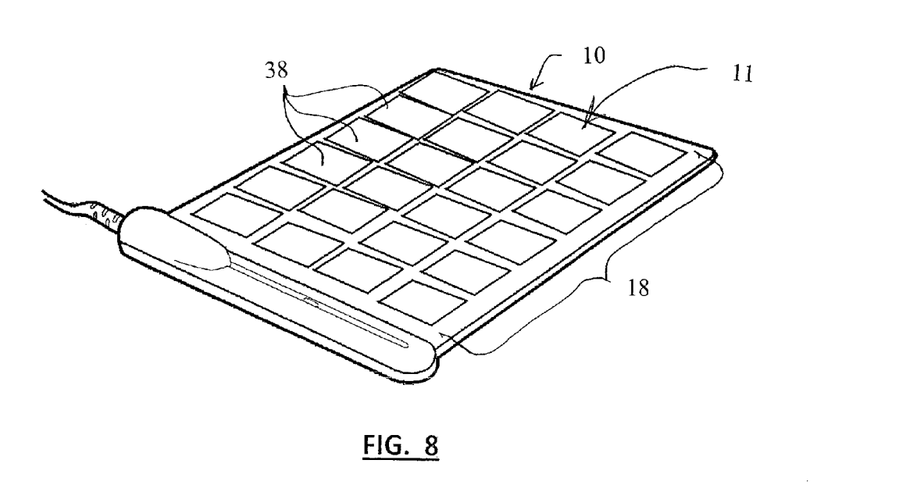
FIG. 8 is a perspective view of the power pad of FIG. 6 showing an array of power transmitting coils within the power delivery pad.

Within the pad 10 is located an array 18 of coils 38 as shown in FIG. 8. Each coil 38 is capable of being energized such that an alternating magnetic field can be produced with field lines predominantly perpendicular to the pad surface 11. In such a way a magnetic coupling can be accomplished with a device 20 that rests on the top of the pad 10.

Various means can be implemented to control the pad 10 in order to minimize stray radiation and losses. In some cases, the number of coils 38 in the array 18 (as shown in FIG. 8 with the top surface removed from the pad 10') can be one. In that case it may be ideal that the coil area is nearly the area of the pad surface 11'.

In other implementations, control and sense circuitry can independently drive one or more of the coils 38 on the pad 10' with an AC power waveform to create an alternating magnetic field. Example drive circuitry will be discussed in more detail below.

Figures 9, 12:
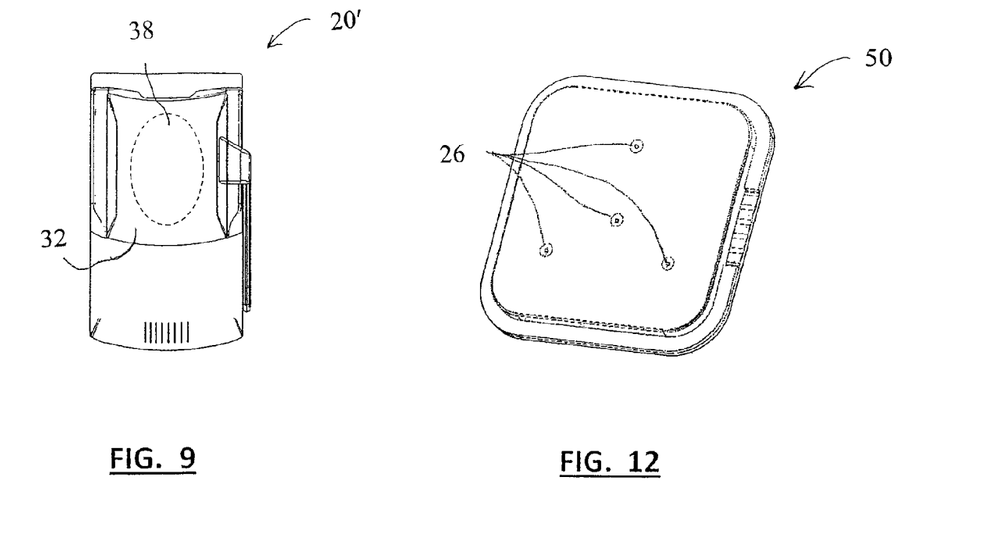
FIG. 9 is a bottom plan view of an example power receiving device (here, a cell phone) showing the approximate location of the inductive power receiving coil in phantom lines.
FIG. 12 is an isometric view of a conductive power receiver module.

An inductive receiver device 20' is shown in FIG. 9. It is similar to the conductive enable device 20' described above, but instead of the conductive contacts 26 described above, an inductive coil 18 (shown in broken line) is embedded in a back cover 32 or other panel or add-on shell or component of a device 20', for example, a cell phone. As such, the back cover or other add-on shell or component (not shown in FIG. 9) of the device 20' can be placed on the device 20' after the time of purchase (aftermarket) by removing the factory installed back cover, and replacing it with the above shown back cover 32 or other component containing the inductive power pick-up coil 40 and receiver circuitry 28', 30', or new devices 20' can be manufactured with the required coil 40, rectifier 28', and power conditioning circuit 30'.

Figure 10:
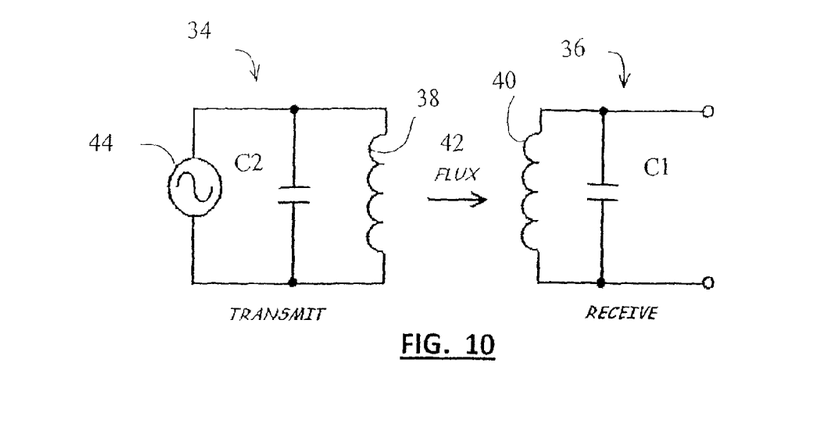
FIG. 10 is a schematic diagram of inductive transmitting and receiving circuits for inductive power transfer from the power pad to the receiver.

To improve transfer efficiency, the inductive receiver pickup circuit 24' can include a resonating inductive circuit 36, as illustrated in FIG. 10, than can be resonated with a capacitor C1 in parallel to the inductor coil 40 as shown in FIG. 10. The coil 38 used in the inductive transmit circuit 34 to create an alternating magnetic field 42, and the coil 40 used to intercept that flux 42 exhibit inductance. Those inductances are depicted in FIG. 10. Also the flux 42 that couples the two coils 38, 40 is shown.

Efficiency is improved on the transmitter circuit side 34 by allowing a circulating current to flow through the resonating capacitor C2 in parallel to the AC generator 44 and coil 38. If not for this capacitor C2, the current would have to flow through the AC generator 44. Note that the internal resistance of the sine wave generator is not shown explicitly in FIG. 10. The current that would flow in the AC generator 44 would contribute to losses in the internal source resistance of the AC generator 44. Resonating the receiver 20 with a capacitor C1 greatly increases the usability of the available output power. The AC potential present on the output terminals (not shown) of the receiver 20 can be rectified passively or synchronously to attain useable DC power from the receiver 20. It should be noted that both coils 38, 40 (transmit and receive) should be resonated at nearly the same frequency in order to achieve the greatest efficiency.

The power driver or generator 44 supplies the AC waveform to excite the transmitter coil 38. This in turn creates an alternating magnetic field 42 at the surface 11' of the transmitter pad 10'. It is this magnetic field 42 that induces a potential that can be extracted by the power receiver 20'.

The sense circuitry 46 serves several purposes. Firstly, the sense circuitry 46 can determine when the exciter should turn on. It may be desirable that the exciter does not turn on until a power receiver 20' is within the appropriate distance of the pad surface 11' to efficiently receive power. In some cases the sense circuitry 46 can determine if power is being drawn from the transmitter circuit 34. In that case, the exciter 44 can periodically turn on for a brief time while the power being drawn is measured. If no device 20' is present on the pad 10', then the power being drawn is presumed to be low. If a device 20' is present on the pad 10', the power will be measurably different than nominal, and this information can be interpreted as an indication that a compatible device 20' is resting on the pad 10'.

As it is desirable that the transmitter 34 creates an AC excitation at the resonant frequency of the receiver circuit 36 to achieve desirable efficiency, a means of determining the receiver resonance is useful. It is worth noting that this resonant frequency changes as a function of device position with respect to the exciter coil, device load, temperature, presence of other devices, and other factors.

One means of achieving resonance is to adjust the receiver circuit 36 to be at a known, predetermined frequency. In this case the transmitter circuit 34 can be set to generate the excitation at that predetermined frequency.

Figure 10A:
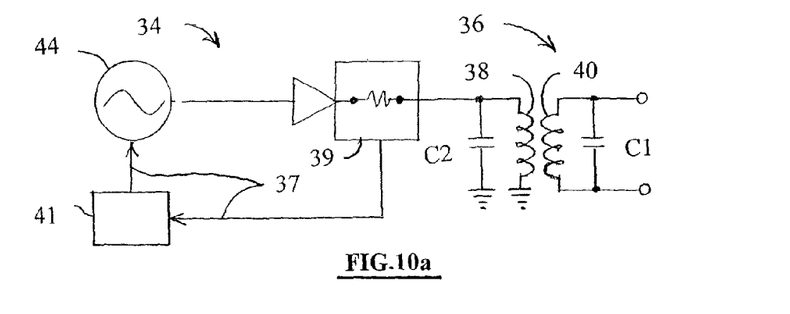
FIG.10a is a block diagram of example inductive transmitting and receiving circuits with a feedback loop.

Alternatively, a means can be implemented in which the exciter sense circuits hunt to find the resonance of the receiver system 36. This can be accomplished with a programmable frequency generator 35 in a feedback loop 37 with phase, amplitude, or power sensing circuits 39 that can be provided in any of a number of techniques known to persons skilled in the art, for example, as illustrated in the block diagram of FIG. 10a where a feedback loop 37 with a compensator 41 take phase, amplitude, or power sensed by the sensing circuit 39 to command the frequency generator 35 to generate the excitation voltage for the coil 38. When the receiver circuit 36 is at resonance, the portion of the exciter current that is most frequency sensitive represents that which is resonating with the receiver circuit 36. When this component of the current is in phase with the excitation voltage, the transmitter circuit 34 is at resonance with the receiver circuit 36.

Figure 11:
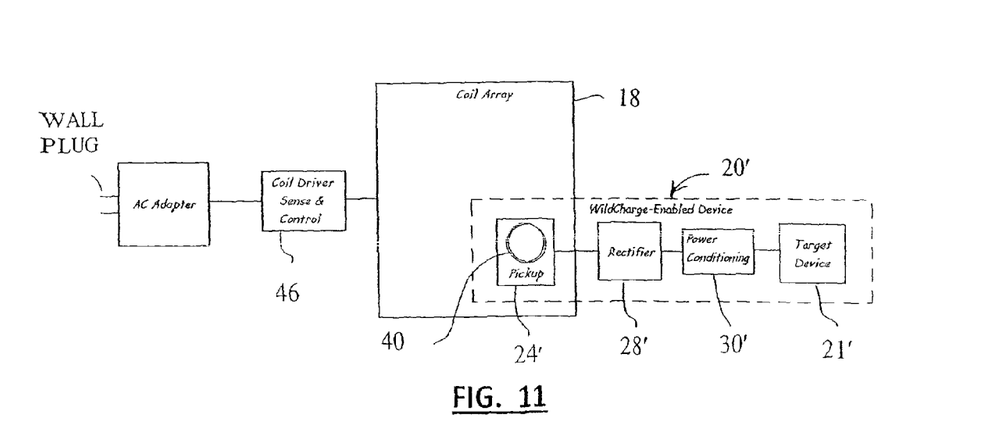
FIG. 11 is a function block diagram of an inductive power transfer system such as that shown in FIG. 7.

A block diagram of the overall inductive system is shown in FIG. 11. In general, each enabled device 20' contains a pickup constellation 24', which includes the inductive receiver circuit 36, a rectifier 28', and a power conditioning circuit 30' to bring power to the target device 21'.

An embodiment of a power receiver module 50 for use on a target device 21 or 21', either as a retro-fit or as new manufactured equipment or features is shown in FIG. 12. This embodiment allows a standard power receiver to be retrofitted into a variety of host devices 21, 21' or in new devices 21, 21'. The power receiver module 50 is shown with conductive contacts 26, but the same kind of module can comprise an inductive receiving circuit 36 as well. The exact shape and dimension of the power receiver module 50 can be substantially different while still falling within the scope of the uniqueness of the concept disclosed in the subject invention. That is, a module 50 functioning as a power receiver that can be embedded into one or more types of enablement architectures.

Figure 13:
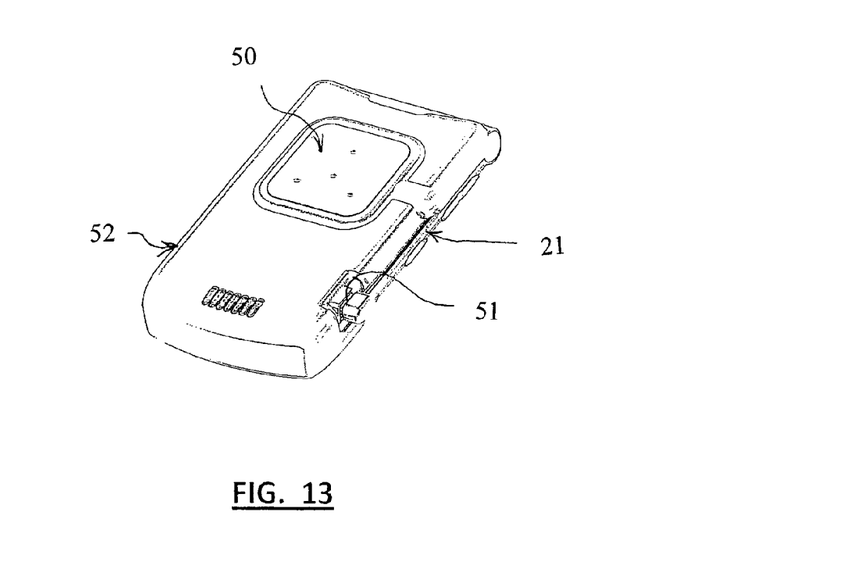
FIG. 13 shows an isometric view of a power receiver module of the present invention embedded in a shell-type housing and mounted on a power receiver device.

An example of an application of the power receiver module 50 embedded in a shell-type housing 52 is shown in FIG. 13. Here the power receiver module 50 is embedded in a "shell" type housing 52 that is illustrated as mounted on a target power receiving device 21, for example, a mobile phone.

The power receiver module 50 can be used to provide wirefree compatibility to target devices 21 with a minimum of effort. The power receiver module makes a "black box" out of the wireless power technology within, simplifying the interface to just a few wires that get routed to the device's input power port 51 (FIG. 13) of target device 21. In addition, the enclosure of the power receiver module allows delicate or intricate, or otherwise inflexible electronics to be embedded within such products as gel, silicon, or other "rubbery" platforms.

Figure 14:
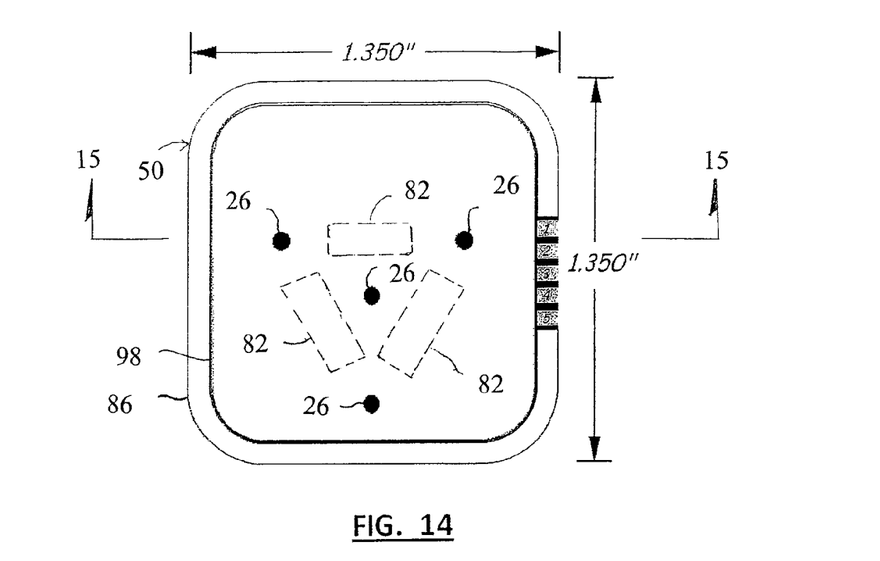
FIG. 14 is a bottom view of the power receiver module showing example dimensions.

FIG. 14 shows example dimensions for a power receiver module 50, although other sizes can also be used. The terminal contact pins 1, 2, 3, 4, 5 are shown for an example as standard zero insertion force (ZIF) connector pins, although other connector schemes or configurations can also be used to route electric power out of the power receiver module 50.

Typical example output ratings or specifications for low power consumption target devices 21 such as cell phones, recorder/playback devices, hearing aids, etc., may include the following (although other ratings or specifications can be used for higher power applications):

Output Voltage 5.0V (0.8V-9.0V factory adjustable)
Output Current 550 mA (100 mA-1.2 A factory adjustable)
Refer to Table 1 for power receiver module pinouts.

TABLE 1

| 1 | V+ |
|---|---|
| 2 | NC |
| 3 | NC |
| 4 | NC |
| 5 | GND |

In other words, in an example application, the power output may be a nominal 5V on pin 1 and ground on pin 5, leaving the pins 2, 3, and 4 unused, or other values can be provided by the circuitry in the power output module 50 for different applications.

Figure 15:
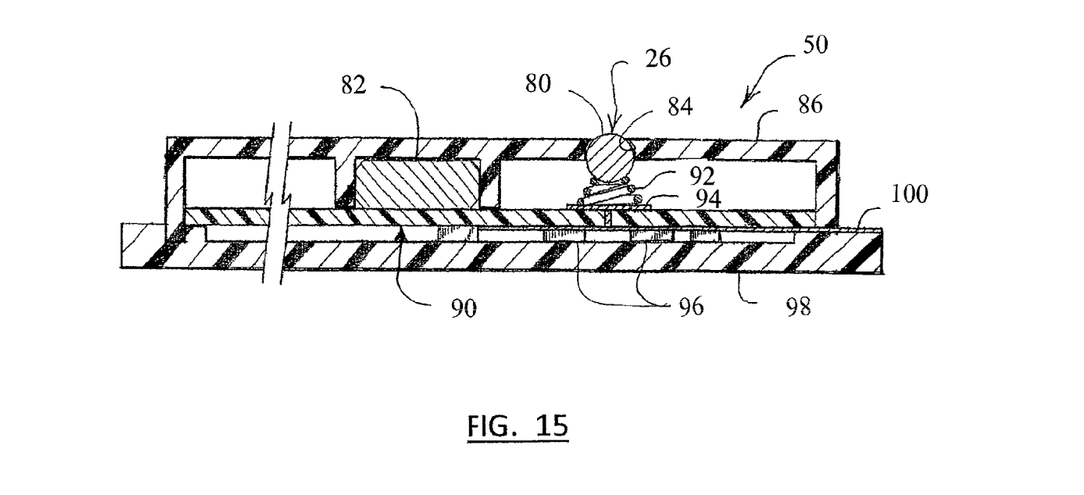
FIG. 15 is a cross-section view of the power receiver module taken substantially along section line 15-15 in FIG. 14.

An enlarged cross-section of the example power receiver module 50 in FIG. 14 is shown in FIG. 15. FIG. 14 is a bottom plan view of the power receiver module 50 to show the example constellation of conduction contacts 26, so, to remain consistent with the bottom plan view orientation of FIG. 14, the power receiver module 50 in FIG. 15 is shown upside down. In normal use, the example ball bearing 80 of at least two of the conductive contacts 26 bear on oppositely charged strips or pad contacts 14, 16 of the power delivery surface 11 of a charging pad 10 (see FIGS. 1 and 2), and the power receiver module 50 can be attracted to and held on the power delivery surface 11 by one or more magnets 82. The cross-section in FIG. 15 shows only one of the contacts 26 and one of the magnets 82 illustrated in FIG. 14, but they are typical of the others.

In the example power delivery module 50 shown in FIG. 15, the ball bearing 80 is nested in a hole 84 in the bottom plate 86, which is shaped to allow vertical sliding and rolling movement of the ball bearing in the hole 84, but to prevent the ball bearing 84 from escaping entirely through the exterior surface of the plat 86. As mentioned above, the magnet 82 nested in the bottom plate 82 is attracted to the power delivery surface 11 of the charging pad 10 (FIGS. 1 and 2), which forces the bottom plate 86 and ball bearing 80 onto the power delivery surface 11.

A conductive, tapered coil spring 92 is positioned between a printed circuit board 90 and the ball bearing 80 to yieldingly push the ball bearing in to the hole 84, which helps the ball bearing 80 to maintain effective electrical contact with the contact strip 14 or 16 of the charging pad 10, even if the power delivery surface 11 is not perfectly flat. The spring 92 is electrically conductive and bears on a conductive plate 94 on the printed circuit board 90, so it conducts electric current between the ball bearing 80 and the printed circuit board 90. The plate 94 is in electrical contact with the components 96 of the printed circuit board 90, which rectify and optionally filter and condition the electric power extracted from the charging pad 10 for use by the target device 21. A top plate 98 covers and retains the printed circuit board 90 in place. Both the bottom plate 86 and top plate 98 can be rigid or semi-rigid plastic, for example, to maintain the structural integrity of the power receiver module 50. Conductive strips 100 can extend from the printed circuit board 90 to the exterior of the power receiver module 50 to form or connect to the ZIF connector pins 1, 2, 3, 4, and/or 5 shown in FIG. 14.

Figure 16A:
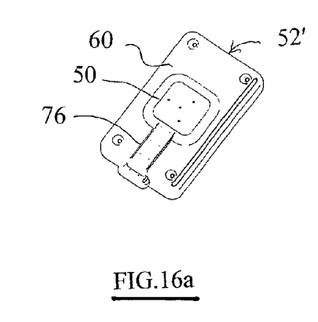
FIGS. 16a and 16b are isometric views of the outside and inside, respectively, of a gel case or shell for mounting the power receiver module on a power receiving device.
Figure 16B:
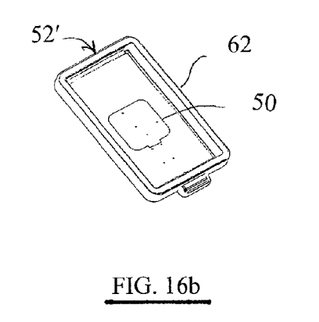

As mentioned above, the power receiver module 50 is adapted to be mounted or molded in an integral manner with a shell or case 52 (see FIG. 13), which can be configured to fit securely on a target device 21, such as a mobile phone or other target device. The outside configuration 60 and inside configuration 62 of an example case or shell in the form of a gel skin 52' are shown in FIGS. 16*a* and 16*b*, respectively. In this example, the power receiver module 50 is embedded in the gel skin 52', and a flexible connector assembly 76 is also mounted or embedded in the gel skin 52' to provide an electrical connection of the power from the power receiver module 50 to the target device 21 (not shown in FIGS. 16*a* and 16*b*) on which the gel skin 52' and power receiver module 50 are mounted.

The "gel" skin 52' serves two purposes. First, it is an attractive, functional protective cover that provides durability to a target device 21. It also has a pleasurable feeling. It can also provide aesthetic enhancement, for example, color or pattern, to the appearance of the target mobile device 21. At the same time, the "gel" skin 52' contains the built-in power receiver module 50, which enables the device 20 to be rechargeable wirefree.

Figure 17:
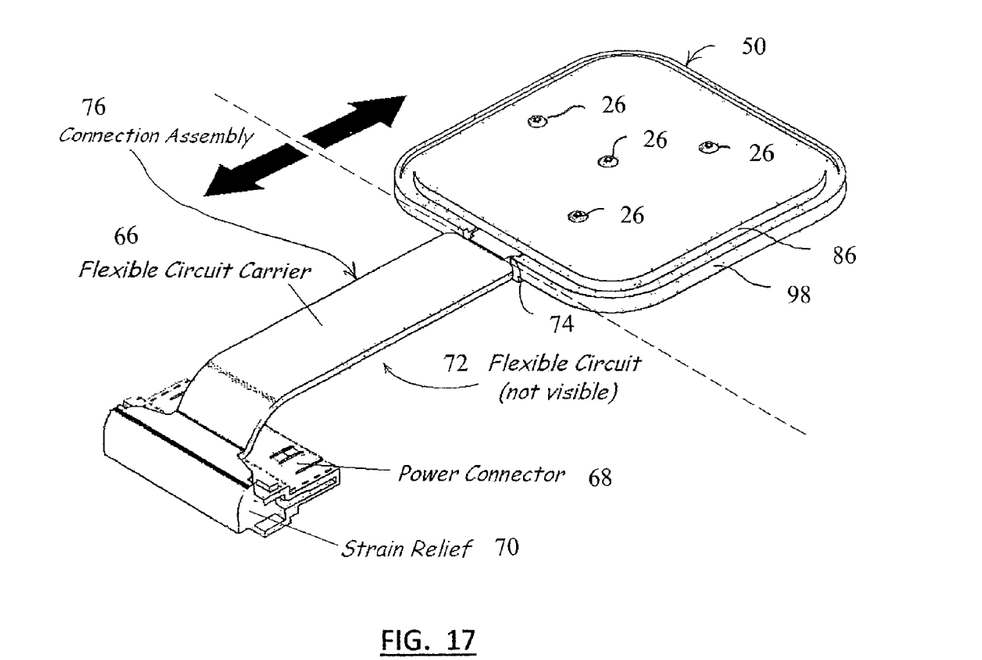
FIG. 17 is an isometric view of a power receiver module showing the power connection assembly used for connecting the power receiver module to a power receiving device.
Figure 18:
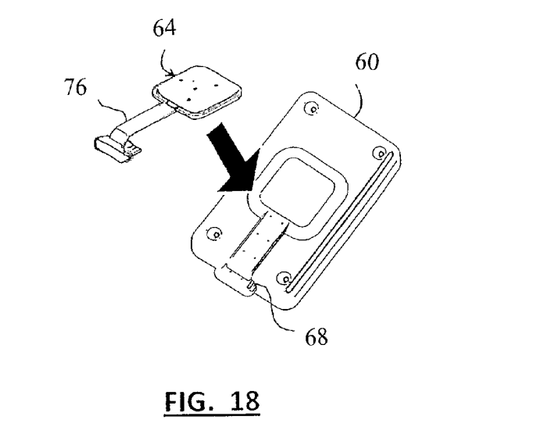
FIG. 18 is a perspective view illustrating the relationship between the power receiver module and the gel case.
Figure 21:
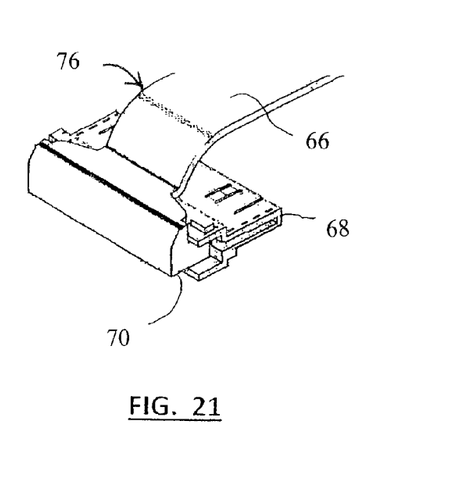
FIG. 21 is a perspective view of an example connector of the power connection assembly used for connecting the power from the power connection assembly to the power receiving device (not shown in FIG. 21)
Figure 22:
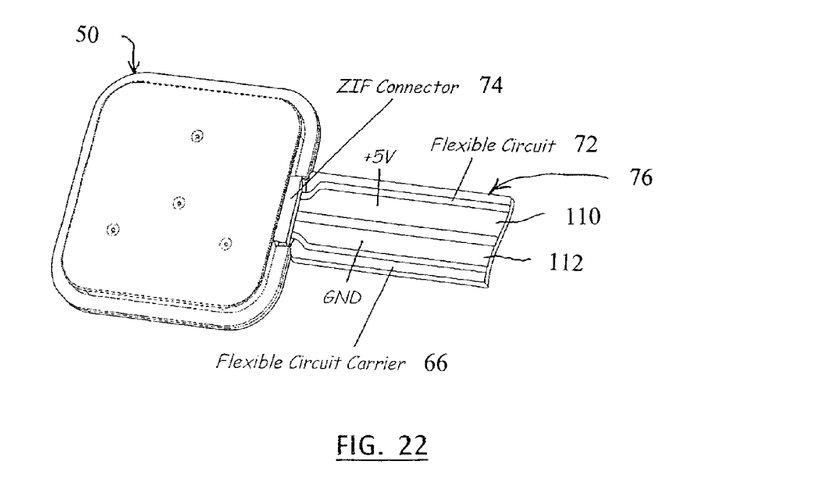
FIG. 22 is an isometric view of an example connection assembly showing the connection between the flexible circuit and the power receiver module.

There are many ways in which the connection between the power receiver module 50 and the input connector of the target mobile device 21 can be made. The example connector assembly 76 shown in FIGS. 16 *a*-22 comprises a flexible printed circuit board (FPC) 72 mounted on a flexible plastic carrier or strap 66. The flexible printed circuit board 72 can have simple leads or conductors 110, 112, as shown in FIG. 22, for carrying power from the power receiver module 50 to a power connector 68, as shown in FIGS. 17 and 21, if the power emerging from the printed circuit board 90 (FIG. 15) of the power delivery module 50 is already appropriately conditioned for use by the target mobile device 21. Alternatively, if desired, the printed circuit board 90 of the power delivery module 50 could be limited to the necessary rectification to derive the power from the charging pad 10 through the constellation contacts 26, and the circuit components to condition the power appropriately for use by the target mobile device 21 could be included on the flexible printed circuit board 72. An advantage of this latter alternative may be that uniform power delivery modules 50 could be made for use with a wide variety of target mobile devices, while the connector assembly 76 can be made with circuit boards 72 having specific power conditioning capabilities for particular kinds or brands of target mobile devices.

Other means includes but are not limited to flat flexible circuit wire (FFC), standard wires of circular cross section, wires of rectangular cross section, and many other possible means of providing an electrical connection embedded within the "gel" skin 52'. This electrical connection is required to pass electrical power from the power receiver module to a connector that mates with the input connector of the host mobile device.

In the example of FIGS. 12-22, the power receiver module 50 is illustrated with conductive wire-free power delivery. It could just as easily be based on inductive wire-free power delivery components as described above without changing the spirit or intent of the present invention.

The implementation can be described in two categories: 1) the provision of an attractive, ergonomic "gel" skin 52'; and 2) the provision of the connection assembly—the connection between the power receiver module 50 and the device 21. The focus of this description will be the connection assembly 76. FIGS. 17 and 21 show the wireless power assembly comprising the power receiver module (or constellation module) 50 and the flexible connector assembly 76 comprising a flexible circuit carrier 66, flexible circuit 72 (not visible), strain relief 70, and power connector 68. Note that the exact implementation of the connection assembly will vary depending on the specific targeted host mobile device 21 being enabled. Nevertheless, FIGS. 17 and 21 help to illustrate the functions needed in such enablements.

Figure 19:
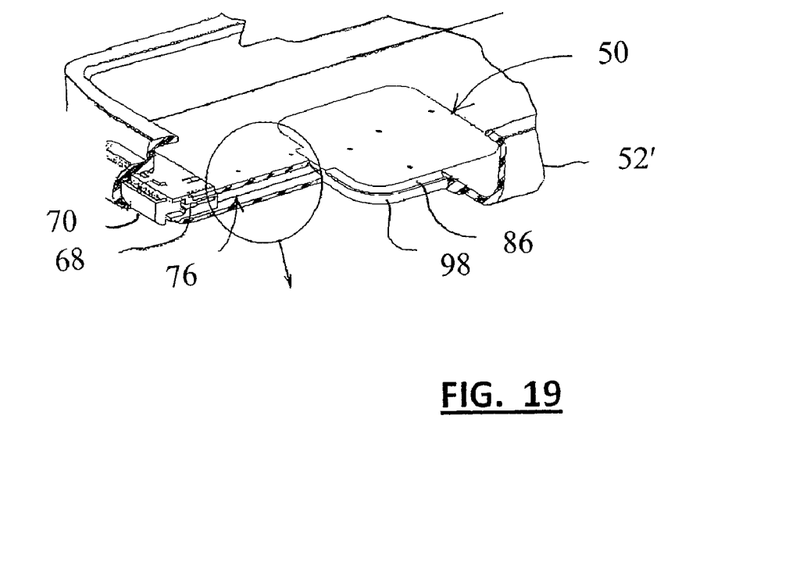
FIG. 19 is an isometric view of an example gel case structure molded together with the power receiver module.
Figure 20:
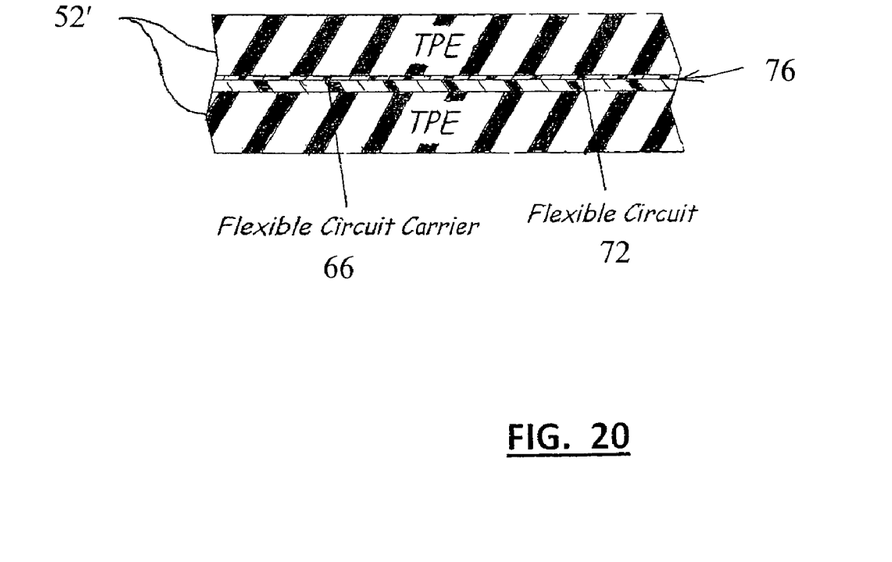
FIG. 20 is an enlarged cross-section of a portion of the cut-away side view of FIG. 19, showing the flexible circuit carrier and flexible circuit of the power connection assembly molded into the gel case or shell.

The power receiver module 50 and flexible connector assembly 76 are insert-molded into the gel case or skin 52', as depicted in FIGS. 19 and 20. Here, insert molding involves the power receiver module 50 and flexible or semi-rigid connection assembly 76 and requires proper gating to insure the material does not flow into unwanted areas. In particular the gel material should not flow into the connector cavity thereby interfering with the ability of the connector to make electrical connection to the device 20. The gates should also prevent material entering the cavity from pulling up the flexible circuit board from the carrier 66 or strain relief 70.

The material should also be blocked from the top and bottom surface of the power receiver module 50. Any material on either the top or bottom of the power receiver module 50 will interfere with operation and increase the overall thickness of the design. The power receiver module 50 and the thermoplastic elastomer (TPE) material that forms the gel skin 52' will chemically bond thereby creating a durable and reliable joint. Note that other materials can be used, such as ThermoPlastic Urethane (TPU), that provide substantially the same material characteristics. The choice of specific material meeting the requirements implied by the nature of this invention can be made by one skilled in the art. This, however, does not vary significantly from the overall spirit and intent of this invention.

The electrical connection between the power receiver module 50 and the power connector 68 is established through traces 110, 112 (FIG. 22) on a flexible printed circuit 72 (also called a flat flexible circuit (FFC)). The flexible circuit 72 is laminated to a preferably flexible, but not stretchable, carrier 66 to provide stability and durability. The laminate 66, 72 is insert-molded within the TPE or other "gel" material.

Some type of strain relief mechanism is required to ensure the reliability of the connection between the flexible circuit carrier 66 and the power connector 68. FIG. 21 shows an example where the flexible circuit carrier 66 and strain relief 70 are a single unit molded of plastic. In this case, the strain relief 70 also serves as a gate to prevent material from flowing into the connector 68 during the overmolding process.

The strain relief 70 relieves the load on the connector 68 from the flexible circuit 72. The flexible circuit 72 does not have the ability to mechanically retain or stabilize the connector 68. Any forces acting between the connector 68 and the flexible circuit 72 could result in damage to the electrical connections critical for operation.

While a strain relief 70, also called a carrier, improves the reliability of this invention, it is not required. Other means such as embedding a flexible wire within the gel may also provide adequate reliability. The preferred embodiment assumes a flexible circuit affixed to a plastic carrier as the most reliable and inexpensive means of bring power from the power receiver module 50 to the host device input connector.

As shown in FIG. 22, the connection assembly 76 interfaces to the power receiver module by plugging into a ZIF (zero insertion force) connector 74 on the power receiver module 50. The flexible circuit carrier 66 should come flush to the power receiver module housing. The flexible circuit 72 should extend further and into the ZIF connector 74.

The ZIF connector 74 is disclosed as the preferred means of connecting the connection assembly 76 to the power receiver module. Other means are possible within the scope and spirit of this invention. For example, direct soldering may be used to make the necessary attachment. Another means would be a connection attained through loaded metal fingers that slide over the conductors as the connection assembly tip is pressed into a receiving slot. These means fall within the scope and intent of this invention and can be readily done by someone skilled in the art.

The power connector 68 for the target device 20 should protrude as little as possible. Ideally the connector 68 would not protrude from the device it is plugged into farther than the thickness of the gel case 52' itself. However, this is not always possible. Many times this requirement calls for a custom connector to be manufactured.

The gel-type molded protective cover with embedded wire-free power receiver module can be implemented with a variety of wire-free power transfer technologies. A purpose of gel-type "skin" 52' is to contain a wire-free power receiver module 50 so that a device 21 can be made compatible with a wire-free power technology by being fitted by such a gel-type skin 52' with an embedded power receiver 50 and simply plug the connector 68 into a power plug receptacle on the target device 21.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The invention claimed is:

1. Apparatus for fitting onto an electric power using device, which has a plug receptacle for receiving electric power, to enable the electric power using device to receive electric power from a recharging pad that has a power delivery surface, comprising:
    a gel-skin case formed to fit and attach snugly onto the electric power using device;
    means for extracting electric power from the power delivery surface formed integrally in the gel-skin case; and
    connector means molded integrally into the gel-skin case for connecting electric power extracted from the power delivery surface by the means for extracting electric power to the plug receptacle of the electric power using device, wherein the connector means includes a flexible printed circuit board, which is laminated with a circuit carrier that is flexible but non-stretchable, and which comprises electric conduction for conducting electric power extracted from the power delivery for extracting electric power to the plug receptacle of the electric power using device.

2. The apparatus of claim 1, wherein the means for extracting electric power from the power delivery surface includes: (i) a non-conductive, rigid or semi-rigid plate supporting a plurality of power receiving contacts protruding in one direction out of the plate for electrical interfacing contact with the power delivery surface; and (ii) a printed circuit board comprising an electronic circuit connected to the power receiving contacts for rectifying electric power received by the plurality of power receiving contacts from the power delivery surface to DC power for use by the power using device.

3. The apparatus of claim 2, wherein the printed circuit board also comprises an electronic circuit for conditioning the rectified power to have characteristics of electric power that is usable by the power using device.

4. The apparatus of claim 2, wherein the connector means also comprises an electronic circuit for conditioning the rectified power to have characteristics of electric power that is usable by the power using device.

5. The apparatus of claim 1, wherein the electric conductors are connected to the a plug connector at the distal end of the flexible printed circuit board, and wherein the plug connector is configured for releasable connection to the plug receptacle of the electric power using device.

6. The apparatus of claim 1, wherein the means for extracting electric power from the power delivery surface includes: (i) a non-conductive, rigid or semi-rigid plate supporting an inductive pickup coil in a resonant power receiving circuit that produces electric power inductively from an alternating magnetic field created by one or more coils in or adjacent the power delivery surface that is part of a resonant power transmitter circuit in which the resonance matches the resonance of the power receiving circuit; and (ii) a printed circuit board comprising an electronic circuit that includes the resonant power receiving circuit and a rectifier circuit for rectifying electric power received by the resonant power receiving circuit from the resonant power transmitter circuit to DC power for use by the power using device.

7. The apparatus of claim 6, wherein the resonant power receiving circuit is set at a pre-selected resonance, and the resonant power transmit circuit is also set at said pre-selected resonance.

8. The apparatus of claim 6, wherein the resonant power transmitter circuit includes a programmable frequency generator in a feedback loop that generates exciter voltage, and a phase-sensing circuit and an amplitude or power sensing circuit to place exciter current in phase with the exciter voltage to match resonance of the resonant power transmitter circuit with the resonance of the resonant power receiver circuit.

* * * * *